Feb. 28, 1956 K. M. BARTLETT 2,736,077
METHOD OF MAKING SHELL MOLD COMPONENTS
Filed May 23, 1951
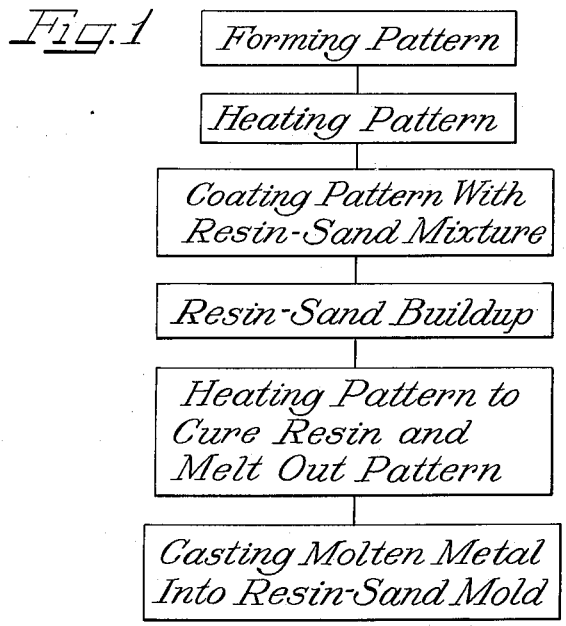
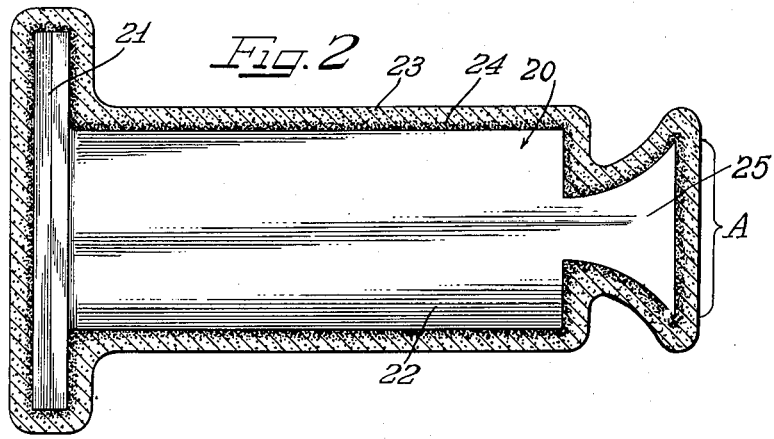
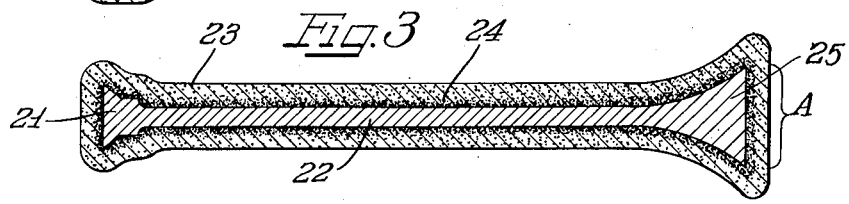
Inventor
Kenneth M. Bartlett United States Patent Office 2,736,077
Patented Feb. 28, 1956

2,736,077

METHOD OF MAKING SHELL MOLD COMPONENTS

Kenneth M. Bartlett, South Euclid, Ohio, assignor to Thompson Products, Inc., Cleveland, Ohio, a corporation of Ohio Application May 23, 1951, Serial No. 227,789

5 Claims. (Cl. 22—193)

The present invention relates to a method for making mold components and particularly to methods for making molds and cores for metal casting.

One of the most significant advances in the foundry art during recent times has been the development of the so-called "shell mold" process for fabricating casting molds and cores. The process is particularly attractive commercially, because it permits precision casting of steel and other metals and metal alloys to tolerances measured in thousandths of an inch, even when casting very thin sections.

Basically, this "shell mold" process consists in providing a suitable pattern, heating the pattern to a slightly elevated temperature, and then coating the heated pattern with a mixture of finely divided sand particles in combination with a thermosetting plastic binder. As the mixture contacts the heated pattern, the temperature of the mixture is raised to the setting temperature of the resin. As the resin commences setting, a self-sustaining coating is formed on the heated surface of the pattern, the depth of the coating being dependent upon the temperature and the time during which the resin-sand mixture is allowed to remain in contact with the surface of the pattern. After a relatively short time, on the order of 10 seconds, the coating will be built up to a thickness on the order of 5 millimeters, which is sufficient for most purposes. At that time, the excess mixture of sand and resin is removed, leaving the pattern with an adherent coating of sand particles bonded together by a set resin binder.

The next stages in the process consist in heating the pattern in contact with the coating at an elevated temperature to cure the resin completely. The most common resin composition employed in this type of process is a phenol-formaldehyde resin containing small amounts of hexamethylene tetramine. As the coating is heated, the hexamethylene tetramine liberates ammonia and formaldehyde, the ammonia acting as a catalyst for the further condensation of the resin to the completely infusible state. After the resin is cured, the assembly is removed from the oven and the mold is stripped from the pattern plate. The resulting half mold is in the form of a thin shell having enough strength and porosity for receiving molten metal during a subsequent casting operation, and permitting gases to escape through the shell.

The process described above is similarly useful for the manufacture of cores, except that, in core manufacture, the molding mixture is blown into a heated core box by means of compressed air. The resin is set and cured as previously described in connection with the manufacture of molds, and the core is readily removed from the core box.

The present invention is concerned with an improvement in the processes outlined above. One of the main features of the present invention resides in the formation of a shell mold with no parting line and this is made possible by selection of the material from which the pattern is fabricated. In the process of this invention, the pattern is made of a material which has a relatively low melting point, and preferably, has a melting point which lies between the setting temperature of the resin and the curing temperature of the resin used in the mold making process. Thus, as the pattern with the coherent coating is heated in the final step to cure the resin by the interaction of the formaldehyde with the phenolic compounds of the resin, the pattern is melted out, leaving only a one piece cured, gas-permeable shell. The removal of the pattern metal at this stage of the process is very advantageous in that it eliminates any danger of fracturing the very thin shell mold after its removal from the furnace, as sometimes occurred in this type of mold making process. The resulting problems of sticking of the resin-sand mixture to the surfaces of the pattern have thus been eliminated in the process of the present invention. Of even greater importance is the fact that through the use of the easily removable pattern material, the one-piece mold structure can be fabricated for complex shapes, where previously complementary two piece mold structures were necessarily employed. The use of a one piece mold structure has the distinct advantage of eliminating any parting line in the mold structure.

An object of the present invention is to provide an improvement in the shell mold making process.

Another object of the invention is the improvement of the shell mold making process by means of which the disadvantages resulting from the shell mold sticking to the pattern plate have been eliminated.

Another object of the present invention is to provide a one-piece shell mold without a parting line in the mold structure.

Still another object of the present invention is to provide a novel type of pattern plate for use in the shell mold making process.

A further description of the present invention will be made in conjunction with the attached sheet of drawings in which:

Figure 1 illustrates the sequence of operations in the process of the present invention;

Figure 2 is a cross-sectional view of a coated pattern used in making a ceramic mold for a turbine bucket; and Figure 3 is a side view of the coated pattern illustrated in Figure 2.

The first step of the process consists in casting or otherwise making the pattern in a suitable die. The particular material to be employed in making the pattern will depend primarily upon the nature of the resin used as a binder. A typical phenol-formaldehyde resin useful in this type of process might have an initial setting temperature on the order of 350° F. and a curing temperature on the order of 550° F. For these conditions, an alloy such as lead solder, containing 67% lead and 33% tin, and having a melting point of about 464° F., might be employed. Other suitable alloys which could be used under these circumstances include an alloy composed of equal parts of lead and tin, having a melting point of about 428° F., or an alloy of lead and bismuth containing 20% lead and 80% bismuth, the latter alloy having a melting point of about 401° F. For other resins and for other setting and curing temperatures, various other relatively low melting materials may be employed. For example, if the final curing temperature is sufficiently high, metallic lead itself, which has a melting point of about 620° F. can be used in making the patterns. On the other hand, if the initial setting temperatures and curing temperatures are relatively low, materials such as bismuth solder, having a melting point of about 232° F., will be used for the pattern material. In between these two conditions, alloys having intermediate melting points will be employed. Such alloys include lead-tin alloys, for example, an alloy containing 40% lead and 60% tin, having a melting point of 374° F., an alloy containing 30% lead and 70% tin, having a melting point of 365° F., or an alloy of lead and bismuth, containing 60% lead and 40% bismuth, the latter having a melting point of about 354° F.

Instead of employing a metallic pattern material, a preferred embodiment of the present invention involves using a low melting salt mixture as the pattern forming material. A typical salt mixture suitable for use as a pattern material is one containing about 50% by weight potassium nitrite, and 50% by weight sodium nitrite. The melting point of this mixture is about 420° F. The use of the salt mixture as a pattern material makes it possible to dissolve out the pattern with water. Alternatively, the salt pattern can be melted out in the same manner that a low-melting pattern metal is melted out of the mold.

Once the pattern has been formed from a selected material, the pattern is then heated to a temperature above the initial setting temperature of the resin to be employed. Next, the heated pattern is contacted with a mixture of sand and resin to reproduce the details of the pattern in the sand and resin mixture. While the present invention is particularly concerned with the use of sand molding material, it will be appreciated that other refractory particles can be employed, if desired. Particularly, a refractory ceramic material such as a mixture of alkaline earth silicates can be used to replace in whole or in part the sand particles.

The composition of the molding material may be varied within a wide range, depending upon the type of resin employed. A typical molding material contains about 90 to 95% by weight of fine silica sand, and 5 to 10% by weight of a plastic binder composition. The latter is preferably a mixture of a phenolic resin and hexamethylene tetramine, containing about 90% phenolic resin and 10% of the hexamethylene tetramine.

In the practice of the present invention, I prefer to use a phenol-formaldehyde condensation product known as a Novolak resin as the phenolic resin. This type of resin is one produced by reacting less than 1 molecular proportion of formaldehyde (usually about 0.8 molecular parts) with 1 molecular part of phenol in the presence of an acid catalyst. This reaction yields a condensation product which is permanently fusible, but capable of being reacted with additional amounts of formaldehyde in the presence of an alkaline catalyst to form a permanently infusible product.

The silica sand, or other refractory particles, are ground together with the plastic binder to form a pulverized mixture. For most processes, the particle size of the mixture should be such that the material passes through a 100 mesh per inch screen.

One method of contacting the heated pattern with the resin-sand mixture consists in clamping the pattern plate with the pattern downwardly over a receptacle containing the resin-sand mixture and then quickly inverting the receptacle, so that the resin-sand mixture is deposited on the pattern. The particles of the sand and resin mixture deposited directly upon the pattern surface are heated up to a temperature at or above the settting point of the resin, so that the sand particles become bonded by the setting of the resinous material. As the resin-sand mixture remains in contact with the heated pattern for longer periods of time, more and more of the sand particles will become bonded together by the resin, forming a self-sustaining shell about the surface of the pattern. This phase of the operation has been denoted as the "resin-sand buildup" in the attached drawings.

After a short period of time, usually on the order of 5 to 10 seconds, the thickness of the shell formed by initial setting of the resin at the surface of the pattern will be on the order of 3 to 5 millimeters. This range of thickness is usually sufficient for using the shell mold in subsequent casting operations. Consequently, after the expiration of this time, the receptacle containing the resin-sand mixture may be turned over, so that excess molding material drops from said resin shell.

Figures 2 and 3 of the drawings have been included to illustrate the process of the invention as applied to the manufacture of a ceramic mold for casting compressor blades for axial flow air compressors of gas turbine engines. As indicated in these figures, a pattern 20 of relatively low melting point material has the configuration ultimately desired in the finished compressor blade, including the flanged root portion 21, a relatively thin curvulate air foil portion 22, and a sprue portion 25. Surrounding the surfaces of the pattern 20 is a resin-sand case 23 of a depth on the order of 3 to 5 millimeters. As indicated in the drawing, the portion of the sand-resin case 23 immediately adjacent the surface of the pattern 20, this portion being indicated generally at 24, will contain the largest amounts of set resin, so that the bonding of the sand particles is the greatest in this region.

As indicated in Figure 1 the attached drawings, the next stage of the operation consists in heating the pattern having the resin shell thereon to a temperature sufficient to cure the resin and to melt out the pattern. In order to permit removal of the pattern material and to provide an entrance to the resulting mold cavity the end wall portion of the mold covering the sprue 25 is broken away in the region designated at "A" in Figures 2 and 3. The temperatures employed in the curing and melting out stage will ordinarily be substantially higher than the temperature at which the resin was initially set. In the case of phenol-formaldehyde resins of the type described, the difference in temperature between the curing stage and the initial setting temperature may be on the order of 200° F. As the temperature is raised to the curing temperature, the hexamethylene tetramine present in the binder is internally decomposed to liberate ammonia and formaldehyde. The ammonia acts as a basic catalyst in the condensation of the liberated formaldehyde with the phenolic compounds present in the binder. At the same time, since the melting point of the pattern material is less than the curing temperature of the resin, the pattern is melted out of the shell. Where a water-soluble salt mixture is used as pattern material, the salt mixture may be removed by solution in water without affecting the set resin.

The time for curing of the resin and melting of the pattern material will ordinarily be on the order of 1 to 10 minutes. Since the pattern material has a relatively high specific gravity the molten pattern material readily flows by gravity through the open end area "A" in the shell mold in the vicinity of the sprue. In addition, the shell is not wetted to any significant degree by the molten metal, so that the porosity of the shell is not impaired by infiltration of the molten metal.

After removal from the curing oven, the one-piece shell is in condition for immediate use in a metal casting process. It will be observed that by using a readily meltable or dissolvable pattern material, the process of the present invention can be used to produce a one-piece mold even for articles of relatively complex shape.

To sustain the mold against the pressure of the liquid casting metal, the space surrounding the mold is preferably filled with steel shot or other suitable material. As the hot metal is poured into the mold, any gases generated from the carbonization of the resinous material, or gases present in the molten metal due to occlusion, readily pass through the gas-permeable shell structure. After solidification of the metal in the mold, the casting can be readily removed by tapping.

From the foregoing, it will be appreciated that the present invention provides a distinct improvement in the shell mold making process. By using a relatively low melting point material as the pattern material, the removal of the pattern from the mold is facilitated without the problems of sticking previously encountered in making molds of this nature, and a one-piece mold can be made for complex shapes.

It will be understood that modifications and variations may be effected without departing from the scope of the novel concepts of the present invention.

I claim as my invention:

1. In a method of making one-piece molds, the steps comprising forming a pattern of the article to be reproduced from a mixture of nitrite salts, coating the pattern with a dry mixture of refractory particles and thermosetting resin binder, and heating the coated pattern to a temperature sufficient to cause setting of the thermosetting resin binder, and thereafter dissolving out the pattern from the set coating.

2. In a method of making one-piece molds, the steps comprising forming a pattern of the article to be reproduced from a mixture of potassium nitrite and sodium nitrite, coating the pattern with a dry mixture of refractory particles and thermosetting resin binder, heating the coated pattern to a temperature sufficient to cause setting of the thermosetting resin binder, and thereafter treating the pattern with water to dissolve out the pattern from the set coating.

3. In a method of making one-piece molds, the steps comprising forming a pattern of the article to be reproduced from a mixture of potassium nitrite and sodium nitrite in substantially equal amounts, coating the pattern with a dry mixture of refractory particles and thermosetting resin binder, heating the coated pattern to a temperature sufficient to cause setting of the thermosetting resin binder, and thereafter treating the pattern with water to dissolve out the pattern from the set coating forming a one-piece mold.

4. In the method of making mold components in which a pattern material is coated with particles of a refractory material bonded together with a thermosetting binder, the steps which comprise providing a pattern of a material having a melting point between the bonding temperature and the setting temperature of said thermosetting binder, coating said pattern with a dry mixture of said refractory material particles and thermosetting binder, heating the coated pattern for a time sufficient to build up a coating of said mixture on the surface of said pattern, and removing the pattern in liquid form from the built up coating.

5. In the method of making mold components in which a pattern material is coated with particles of a refractory material bonded together with a thermosetting binder, the steps which comprise providing a pattern of a metal having a melting point between the bonding temperature and the setting temperature of said thermosetting binder, coating said pattern with a dry mixture of said refractory material particles and thermosetting binder, heating the coated pattern for a time sufficient to build up a coating of said mixture on the surface of said pattern, and removing the pattern in liquid form from the built up coating by heating the pattern to a temperature sufficient to set the binder and to melt the pattern.

References Cited in the file of this patent

UNITED STATES PATENTS

| | | |
|---|---|---|
| 1,262,973 | Pack et al. | Apr. 16, 1918 |
| 2,420,851 | Zahn et al. | May 20, 1947 |
| 2,508,006 | Birch | May 16, 1950 |

FOREIGN PATENTS

| | | |
|---|---|---|
| 585,665 | Great Britain | Feb. 18, 1947 |

OTHER REFERENCES

Modern Metals, July 1949, pages 41–42.

Fiat Final Report No. 1168, The "C" Process of Making Molds and Cores for Foundry Use by McCulloch. Pub. May 30, 1947 by Office of Technical Services, Dept. of Commerce, Washington, D. C. Entire report 10 pages. Pages "1" and "2" relied upon.